United States Patent [19]
Kanbe et al.

[11] Patent Number: 5,188,272
[45] Date of Patent: Feb. 23, 1993

[54] GUIDE ROLLER WITH METAL CYLINDER AND RESIN PORTION

[75] Inventors: Hiroyuki Kanbe; Kazunori Okamura, both of Tokyo, Japan

[73] Assignee: Nippon Chemi-Con Corporation, Tokyo, Japan

[21] Appl. No.: 825,406

[22] Filed: Jan. 24, 1992

Related U.S. Application Data

[63] Continuation of Ser. No. 668,367, Mar. 13, 1991, abandoned, which is a continuation of Ser. No. 431,065, Nov. 3, 1989, abandoned.

[51] Int. Cl.$^5$ ............................................. B65H 20/00
[52] U.S. Cl. ...................................... 226/190; 226/194; 242/76; 384/296; 384/416
[58] Field of Search ................. 226/190, 194, 168; 242/76, 75.2; 384/276, 296, 297, 298, 299, 300, 416, 418, 908

[56] References Cited

U.S. PATENT DOCUMENTS

| | | | |
|---|---|---|---|
| 3,033,623 | 5/1962 | Thomson | 384/299 |
| 3,400,988 | 6/1963 | Hudson et al. | 384/416 |
| 3,640,427 | 10/1974 | Domer | 386/416 X |
| 3,902,868 | 9/1968 | Hammond | 226/190 X |
| 3,922,044 | 9/1968 | Bucalo | 384/276 |
| 4,033,495 | 7/1977 | Platt | 226/190 X |
| 4,169,637 | 10/1976 | Voitas | 384/276 X |
| 4,428,689 | 1/1984 | Choate | 384/296 |
| 4,607,808 | 8/1986 | Collins | 226/190 X |
| 4,717,268 | 1/1988 | Orkin | 384/297 X |
| 4,729,500 | 3/1988 | Gwon | 242/76 |

*Primary Examiner*—Daniel P. Stodola
*Assistant Examiner*—P. Bowen
*Attorney, Agent, or Firm*—Sughrue, Mion, Zinn, Macpeak & Seas

[57] ABSTRACT

A guide roller for guiding a tape being moved in contact therewith, which has a metal cylinder and a resin portion is able to augment a inertial moment of the roller guide without increment of the diameter of the guide roller to absorb the vibration of the tape.

9 Claims, 2 Drawing Sheets

GUIDE ROLLER WITH METAL CYLINDER AND RESIN PORTION

This is a continuation of application Ser. No. 07/668,367 filed Mar. 13, 1991, now abandoned, which was a continuation of application Ser. No. 07/431,065 filed Nov. 3, 1989, now abandoned.

BACKGROUND OF THE INVENTION

The present invention relates to a guide roller appropriate to restrict the position of a magnetic tape being moved in contact with the guide roller in a video cassette recorder, for example.

FIG. 3 is a partially sectional view of a conventional guide roller of such kind. The guide roller comprises a shaft 1, a rotary body 2 fitted around the shaft coaxially thereto, an attaching ring 4 formed with a male screw thread 3 and mounted on the shaft coaxially thereto, a flange 7 having slits 6, and a flange 8 having a through-hole. The attaching ring 4 is mounted on the shaft 1 after the rotary body 2 is fitted around the shaft. The rotary body 2 is constructed by rotary & cylinder 5 made of a resin, which constitutes the tape guide surface of the guide roller. When the rotary body 2 is fitted around the shaft 1, the flange 7 is first secured to the shaft at the upper end thereof and then turned upside down together with the shaft, and the flange 8 is thereafter press-fitted on the shaft over the cylinder and located so that the rotary cylinder can be smoothly rotated. After that, the attaching ring 4 is press-fitted on the shaft 1 through the use of a jig. For example, the guide roller is set up on the metal base of a video tape recorder at a prescribed angle thereto. The metal base has a tapped hole in which the male screw thread 3 of the attaching ring 4 is fixed. The flat bit of a screwdriver is inserted into the slits 6 of the flange 7 and rotated to turn the whole of the guide roller to tighten the male screw thread so as to adjust the height of the guide roller relative to the metal base.

When a magnetic tape is moved in contact with the tape guide surface of the guide roller, the rotary cylinder 5 is rotated at a substantially constant speed. The constant speed movement of the rotary cylinder 5 effects to absorb the vibration of the magnetic tape being moved in contact with the tape guide surface of the guide roller. The larger the inertial moment of the rotary cylinder 5 has the higher the vibration absorbing effect of the movement thereof. However, since the conventional rotary cylinder 5 is made of only the resin, the diameter thereof needs to be increased if the inertial moment thereof is to be augmented. In other words, the conventional guide roller is disadvantageous that if the inertial moment of the rotary cylinder 5 is to be augmented, the guide roller may become greater than average in large size.

SUMMARY OF THE INVENTION

The present invention is to solve the above mentioned problem. Accordingly, it is an object of the present invention to provide a guide roller whose feature is that the guide roller comprises a rotary body made of a metal rotary cylinder which is coated with a resin on both the end faces of the cylinder and the inside circumferential surface thereof and which is rotated as a tape is moved in contact with the out side circumferential surface of the cylinder; a first and a second flange; and a single shaft around which the rotary body and the flanges are provided in such a manner that the rotary body is interposed between the flanges.

Since the rotary body is made of the metal rotary cylinder much larger in specific gravity than resin, and coated with the resin on both the end faces of the metal rotary cylinder and the inside circumferential surface thereof, the inertial moment of the rotary body can be made much higher, despite the sufficiently small diameter thereof, than a rotary body made of only a resin, so that the vibration of the tape being moved in contact with the outside circumferential surface of the metal rotary cylinder is enough absorbed by the above-described rotary body. Since the resin coating both the end faces of the metal rotary cylinder and the inside circumferential surface thereof is put in contact with the flanges and the shaft, the above-described rotary body is rotated as smoothly as the conventional rotary body made of only the resin.

DETAILED DESCRIPTION OF THE PREFERRED EMBODIMENTS

Embodiments of the present invention are hereafter described in detail with reference to the drawings attached hereto.

Figure 1:
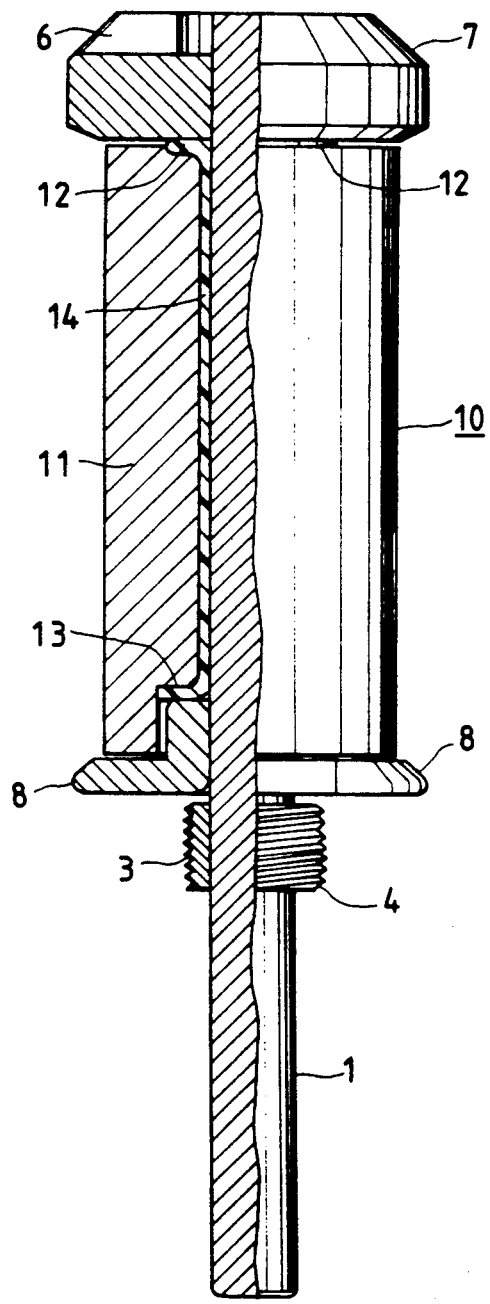
FIG. 1 is a partially sectional view of a guide roller as and embodiment of the present invention.

FIG. 1 shows a guide roller which is one of the embodiments. The guide roller comprises a shaft 1, an attaching ring 4 formed with a male screw thread 3 on the & outside circumferential surface of the ring, a flange 7 having slits 6, a flange 8 having a through-hole, and a rotary body 10 made of a metal rotary cylinder 11 constituting the tape guide surface of the guide roller. The attaching ring 4 and the rotary body 10 are provided around the shaft coaxially thereto. Both the end faces 12 and 13 of the inner portion of the metal rotary cylinder 11 and the inside circumferential surface of the portion are coated with a self-lubricating resin 14 such as polyacetal and Teflon. When the rotary body 10 is to be fitted around the shaft 1, the flange 7 is first secured to the shaft at the upper end thereof and then turned upside down together with the shaft, the metal rotary cylinder 11 is then loosely fitted around the shaft, and the hollow flange 8 & is thereafter press-fitted on the shaft over the metal cylinder and located in such a position that the cylinder can be smoothly rotated. After that, the attaching ring 4 is press-fitted on the shaft 1 through the use of a jig. For example, the guide roller is set up on the metal base of a video tape recorder at a prescribed angle thereto. The male screw thread 3 of the ring 4 is engaged in the tapped hole of the metal base. The flat bit of a screwdriver is then inserted into the slits 6 of the flange 7 to turn the whole guide roller to tighten the male screw thread 3 so as to adjust the height of the guide roller relative to the metal base.

Figure 2:
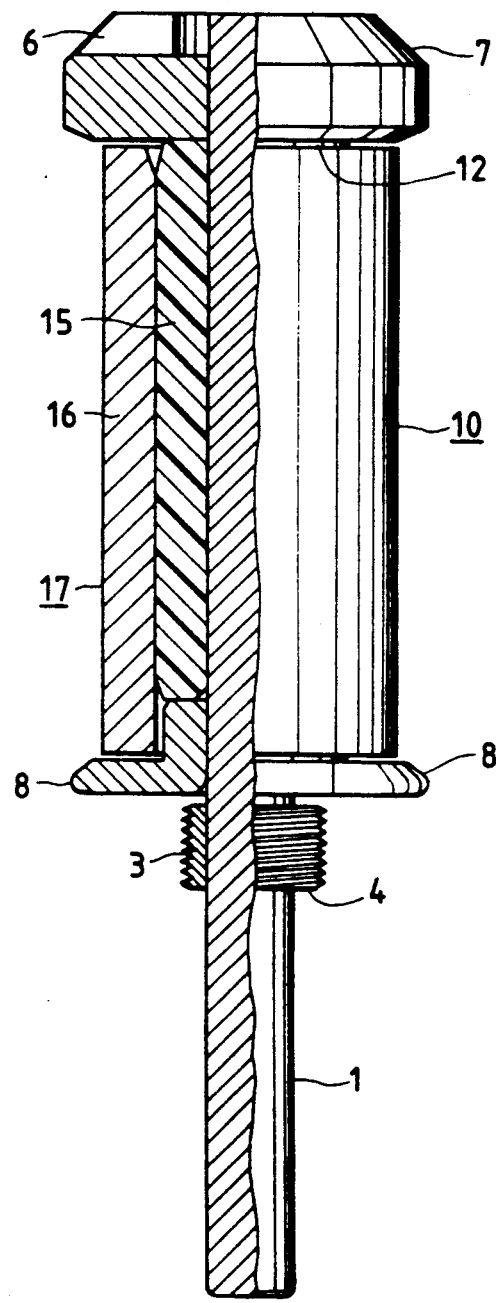
FIG. 2 is a partially sectional view of a guide roller as another embodiment of the present invention.
Figure 3:
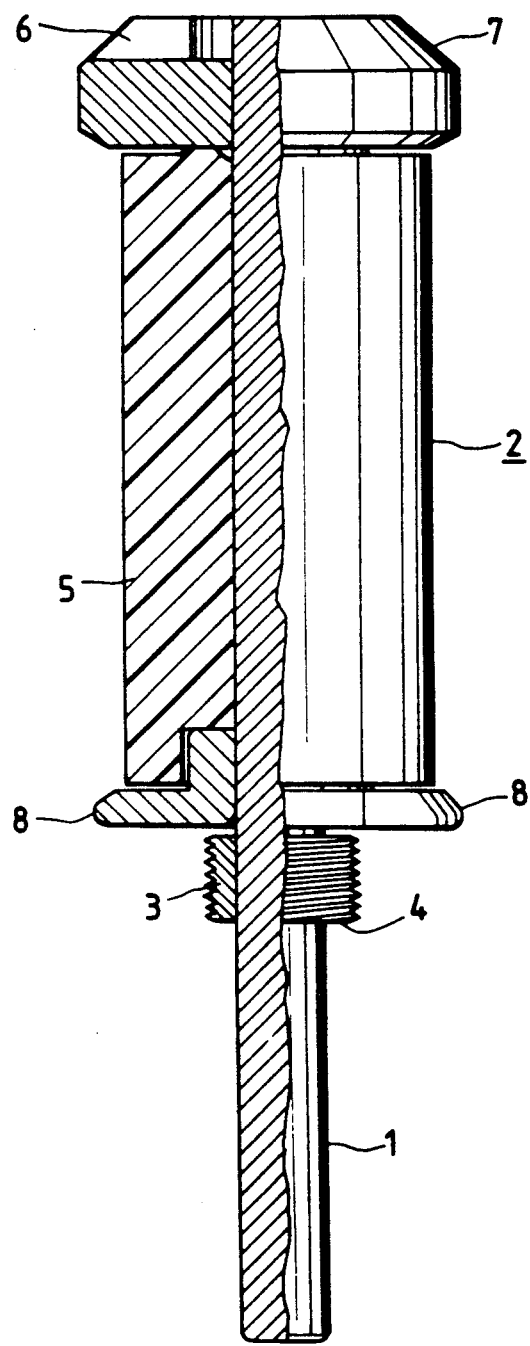
FIG. 3 is a partially sectional view of a conventional guide roller.

FIG. 2 shows a guide roller which is the other of the embodiments. In this guide roller, the rotary body 17 of the guide roller is composed of both an outer metal cylinder 16 and an inner resin cylinder 15 which is made of a self-lubricating resin such as polyacetal and Teflon and is press-fitted in the outer metal cylinder. Both the end faces of the inner resin cylinder 15 are in contact with flanges 7 and 8 secured to a shaft 1, but both the end faces of the outer metal cylinder 16 are out of contact with the flanges. The guide roller is used in the same manner as that shown in FIG. 1.

What is claimed is:

1. A guide roller for guiding a tape adapted to traverse said guide roller and adapted for attachment to a base, comprising:
    a shaft;
    means for attenuating vibration of said tape as said tape traverses said guide roller, said means comprising a rotary body fitted around the shaft coaxially thereto, including a metal cylinder and a resin portion between a circumferential surface of the shaft and an inner surface of the metal cylinder, said metal cylinder being rotated as said tape is moved in contact with an outer circumferential surface of said metal cylinder and said metal cylinder having a larger specific gravity than said resin portion to increase an inertial moment of said rotary body;
    a first flange secured to an upper end of the shaft;
    a second flange having a through-hole for accommodating the shaft, wherein said resin portion contacts said first and second flanges and wherein said metal cylinder is out of contact with said first and second flanges when said resin portion contacts said first and second flanges, wherein said first and second flanges restrict a position of said tape being moved in contact with said roller, and a position of said rotary body; and
    an attaching ring fixed to the shaft coaxially thereto and adapted to be coupled to said base such that said second flange is spaced a predetermined distance from said base.

2. A guide roller as claimed in claim 1, wherein said resin portion is formed at both end faces and inner circumferential surface of the inner portion of the metal cylinder, said resin portion forming a coated resin layer.

3. A guide roller as claimed in claim 2, wherein said resin portion is made of a self-lubricating resin.

4. A guide roller as claimed in claim 1, wherein said resin portion is formed as an inner resin cylinder which is fitted with said metal cylinder.

5. A guide roller as claimed in claim 4, wherein said resin portion is made of a self-lubricating resin.

6. A guide roller as claimed in claim 1, wherein said resin portion is made of a self-lubricating resin.

7. A guide roller for guiding a tape adapted to traverse said guide roller and adapted for attachment to a base, comprising:
    means for attenuating vibration of said tape as said tape traverses said guide roller, said means comprising a rotary body fitted around a shaft coaxially thereto, including a metal cylinder having a resin coating on the end faces of said metal cylinder and the inside circumferential surface thereof and which is rotated as said tape is moved in contact with the outside circumferential surface of said metal cylinder, and said metal cylinder having a larger specific gravity than said resin coating to increase an inertial moment of said rotary body;
    a first flange and a second flange;
    a single shaft around which said body and first and second flanges are provided such that said body is interposed between said first and second flanges, wherein said resin coating contacts said first and second flanges and wherein said metal cylinder is out of contact with said first and second flanges when said resin portion contacts said first and second flanges, wherein said first and second flanges restrict a position of said tape being moved in contact with said roller, and a position of said rotary body; and
    an attaching ring fixed to the shaft coaxially thereto and adapted to be coupled to said base such that said second flange is spaced a predetermined distance from said base.

8. A guide roller as claimed in claim 7, wherein said resin coating is put in contact with the flanges and the shaft.

9. A guide roller for guiding a tape adapted to traverse said guide roller and adapted for attachment to a base, comprising:
    a double structural rotary body having a metal cylinder and a resin portion;
    first and second flanges disposed on first and second ends, respectively, of said rotary body;
    a single shaft around which said rotary body and said first and second flanges are disposed; and
    an attaching ring fixed to the shafted coaxially thereto and adapted to be coupled to said base such that said second flange is spaced a predetermined distance from said base,
    wherein said first and second flanges contact edges of said resin portion while out of contact with edges of said metal cylinder when said edges of said resin portion contact said first and second flanges secured to said single shaft, and
    wherein a position of said rotary body is restricted by said first and second flanges, and said rotary body rotates by contacting said resin portion with an outer circumferential surface of said shaft.

* * * * *